US012313239B2

(12) United States Patent
Coakley et al.

(10) Patent No.: US 12,313,239 B2
(45) Date of Patent: May 27, 2025

(54) RECESSED DOWNLIGHT FIXTURE

(71) Applicant: Lutron Technology Company LLC, Coopersburg, PA (US)

(72) Inventors: Steven F. Coakley, Austin, TX (US); John P. Michalko, Austin, TX (US); Derek E. Logan, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/541,541

(22) Filed: Dec. 15, 2023

(65) Prior Publication Data

US 2024/0110677 A1 Apr. 4, 2024

Related U.S. Application Data

(63) Continuation of application No. 17/734,393, filed on May 2, 2022, now Pat. No. 11,846,401, which is a continuation of application No. 17/086,686, filed on Nov. 2, 2020, now Pat. No. 11,320,101, which is a continuation of application No. 16/532,306, filed on Aug. 5, 2019, now Pat. No. 10,823,349, which is a continuation of application No. 15/088,922, filed on Apr. 1, 2016, now Pat. No. 10,371,329.

(51) Int. Cl.

| | |
|---|---|
| ***F21S 8/02*** | (2006.01) |
| ***F21V 17/10*** | (2006.01) |
| ***F21V 21/04*** | (2006.01) |
| ***F21V 23/02*** | (2006.01) |
| ***F21V 29/503*** | (2015.01) |
| *F21Y 115/10* | (2016.01) |

(52) U.S. Cl.
CPC ............ *F21S 8/026* (2013.01); *F21V 17/105* (2013.01); *F21V 21/042* (2013.01); *F21V 23/026* (2013.01); *F21V 29/503* (2015.01); *F21Y 2115/10* (2016.08)

(58) Field of Classification Search
CPC ...... F21S 8/026; F21V 17/105; F21V 21/042; F21V 23/026; F21V 29/503; F21Y 2115/10
See application file for complete search history.

(56) References Cited

U.S. PATENT DOCUMENTS

| | | | |
|---|---|---|---|
| 7,517,119 | B2 | 4/2009 | Kaeser et al. |
| 8,215,805 | B2 | 7/2012 | Cogliano et al. |
| 8,226,278 | B2 | 7/2012 | Ward et al. |
| 8,393,763 | B2 | 3/2013 | O'Boyle et al. |
| 8,454,204 | B1 | 6/2013 | Chang et al. |
| 9,004,728 | B2 | 4/2015 | Thompson |
| 9,243,786 | B1 | 1/2016 | Onda et al. |
| 9,822,957 | B2 | 11/2017 | Coakley et al. |

(Continued)

*Primary Examiner* — Seung H Lee
(74) *Attorney, Agent, or Firm* — Michael S. Czarnecki; Glen R. Farbanish; Philip N. Smith

(57) ABSTRACT

A recessed downlight fixture and method for installation is provided. The recessed downlight fixture can be installed in a retrofit application, after a ceiling is installed, through a pre-existing opening in that ceiling. Alternatively, a recessed downlight fixture according to a second embodiment can be installed before a ceiling is present. In either embodiment, the light source coupled to, for example, a heat sink, can be universally moved in three degrees of movement, rotationally, along a tilt axis, or further within the ceiling to increase or decrease the recess. All such universal adjustments can take place through and below the ceiling opening during or after installation.

13 Claims, 9 Drawing Sheets

(56) References Cited

U.S. PATENT DOCUMENTS

| | | | |
|---|---|---|---|
| 9,857,038 | B2 | 1/2018 | Coakley et al. |
| 10,344,958 | B2 | 7/2019 | Mathews et al. |
| 10,371,329 | B2 | 8/2019 | Coakley et al. |
| 10,823,349 | B2 | 11/2020 | Coakley et al. |
| 2005/0183344 | A1 | 8/2005 | Ziobro et al. |
| 2006/0250788 | A1 | 11/2006 | Hodge et al. |
| 2007/0253200 | A1 | 11/2007 | Russello et al. |
| 2010/0110698 | A1 | 5/2010 | Harwood et al. |
| 2015/0078012 | A1 | 3/2015 | Delano |

RECESSED DOWNLIGHT FIXTURE

RELATED APPLICATIONS

This application is a continuation of U.S. patent application Ser. No. 17/734,393, filed May 2, 2022; which is a continuation of U.S. patent application Ser. No. 17/086,686, filed Nov. 2, 2020, now U.S. Pat. No. 11,302,101 issued May 3, 2022; which is a continuation of U.S. patent application Ser. No. 16/532,306, filed Aug. 5, 2019, now U.S. Pat. No. 10,823,349 issued Nov. 3, 2020; which is a continuation of U.S. patent application Ser. No. 15/088,922, filed Apr. 1, 2016, now U.S. Pat. No. 10,371,329, issued Aug. 6, 2019; all of which are incorporated by reference herein in their entirety. U.S. patent application Ser. No. 15/088,922 is related to applications filed concurrently therewith under U.S. patent application Ser. No. 15/088,813, titled "Recessed Downlight Fixture and Method for Installing and Universally Adjusting the Fixture in a Retrofit Application", now U.S. Pat. No. 9,822,957, issued Nov. 21, 2017, and U.S. patent application Ser. No. 15/088,864, titled "Recessed Downlight Fixture and Method for Installing and Universally Adjusting the Fixture in a New Construction Application", now U.S. Pat. No. 9,857,038, issued Jan. 2, 2018.

BACKGROUND OF THE INVENTION

1. Field of the Invention

This invention relates to the field of interior lighting and, more particularly, to recessed downlight fixtures that can accommodate three degrees of adjustment below and through an opening in either a retrofit or new construction application.

2. Description of the Relevant Art

Lighting within a structure, such as a residential or commercial structure, is generally referred to as interior lighting. Contrary to interior lighting, lighting can also be employed exterior of the structure. Exterior lighting in many instances utilize a different lighting fixture and light source than an interior lighting fixture and source, and the exterior lighting device can be mounted altogether different from an interior lighting fixture and light source.

Similar to the differences between interior lighting and exterior lighting, interior lighting has many different types of lighting devices. The subject matter hereof is focused on interior lighting and, more particularly on a specific type of interior lighting, oftentimes referred to as recessed interior lighting.

Recessed interior lighting generally involves a recessed lighting fixture as well as a light source, where the fixture is typically installed in hollow ceiling spaces such that the fixture is hidden above an interior ceiling with only an opening and surrounding trim visible from below the ceiling. Recessed lighting fixtures are widely used for residential and commercial applications, and generally comprise fixtures that fall within two broad categories: downlights or wall wash lights. In some instances, recessed lighting fixtures can fall within both categories of downlights and wall wash lights, and are often grouped together and termed as downlights.

Downlights are designed so that the downlight fixtures direct light straight down from the ceiling, whereas wall wash lights and their associated fixtures cast an oblique illumination from the ceiling onto a nearby wall surface. The description hereof pertains to interior recessed lighting fixtures and, more specifically, interior recessed downlight fixtures.

Interior recessed downlight fixtures typically include a housing of some form of metal at least partially surrounding a light source and supported above an opening in the interior ceiling. The housing can be coupled to a source of electrical power with electrical conduit or the like pursuant to applicable building codes and regulations. The bottom of the recessed enclosure has an aperture which is aligned with an opening cut in the interior ceiling. The opening is normally finished with an ornamental trim which may also serve to support various accessories such as lens, light diffusers, condensers, baffles, filters and the like.

A common method of supporting recess light fixtures is by hanging those fixtures from existing ceiling joists, such as wooden beams. For example, a pair of parallel hanger bars can be nailed to the joist and the recessed housing can be hung between the two hanger bars by hanger brackets fastened to the recessed housing. The hanger brackets can be repositioned along the vertical line on the recessed fixtures so that the fixtures can be raised or lowered relative to the hanger bars, for adjusting the height of the recessed housing relative to the ceiling.

The recessed light fixtures are generally available in a variety of shapes, some of them being cylindrical, and others being square or rectangular boxes. The recessed light fixtures, while moveable on the parallel hanger bars between the ceiling joists, and also moveable in the vertical line for adjustment relative to the ceiling, the conventional recessed downlight fixture typically does not allow adjustment of the light source relative to the fixture. Instead, conventional recessed downlight fixtures only allow the light source to illuminate straight down along the vertical line once the fixture is secured to the hanger brackets.

The limited adjustment of a downlight fixture is increasingly problematic as the ceiling space or ceiling plenum becomes crowded. For example, the ceiling spaces can be occupied with ventilation ducts, fire sprinkler systems, conduits of various kinds for data cables, audio wiring, surveillance systems and layers of insulation. It sometimes occurs that the recessed interior downlight fixture cannot be installed in an optimal location because of such impediments in the ceiling space. Moreover, the junction box associated with the recessed downlight fixture oftentimes includes a transformer, ballast, or pulse width modulation (PWM) current drivers used, for example, as light emitting diode (LED) drivers that add to the crowded space above the recessed downlight fixture. Yet, the light source of a typical downlight fixture that has no adjustment capability must be directed to possibly an undesired location if the fixture is not optimally mounted on the hanger brackets and hanger bars.

Modern interior lighting has undergone a significant transformation in recent years. The incandescent light source, and in some instances the fluorescent light source, has been replaced by LEDs. More modern LED light sources generally include an array of LEDs thermally mounted to a heat sink. The LED drives obtain power from the AC mains. Recessed downlight fixtures that use LEDs are replacing existing incandescent or fluorescent recessed downlight fixtures at a rapid pace. One reason for replacing downlight fixtures with LED downlight fixtures is the energy savings, as well as the ability to control the color and luminance output from LEDs, which cannot easily be done in conventional incandescence or fluorescent light sources.

A need exists for retrofitting existing downlight fixtures with newer, more energy efficient LED recessed downlight fixtures. The desired LED recessed downlight fixtures can vary in structure and shape depending on whether they are installed in new construction or in an existing ceiling. In new construction, a ceiling does not exist, and the fixture can be mounted to the ceiling joist. The ceiling is thereafter installed beneath the fixture with an opening through the ceiling to accommodate the light source and illumination therefrom. Conversely, in a retrofit application, the ceiling already exists. For example, the replacement LED downlight fixture must be inserted into the existing opening of the ceiling that previously accommodated the incandescent or fluorescent downlight fixture.

A need exists not only for installing a recessed downlight fixture in a retrofit application or new construction application, but also being able to make adjustments to after the install and even after the ceiling is in place. Regardless of whether the LED downlight fixture is utilized in a retrofit or a new construction application, such a fixture should beneficially be one that allows universal adjustment of the light source to overcome the increasingly crowded ceiling space and the constraints placed on the location of the recessed downlight fixture. This problem is even more acute when replacing incandescent or fluorescent recessed downlight fixtures with LED recessed downlight fixtures, since it is even more desirable to change the LED illumination pattern relative to the prior incandescent illumination pattern due to the difference in illumination between LEDs and incandescence or fluorescent lighting sources.

SUMMARY OF THE INVENTION

The problems outlined above are in large part solved by an improved recessed downlight fixture hereof. The recessed downlight fixture is improved in that it can accommodate an LED light source in either a retrofit application or a new construction application. In a retrofit application, the LED recessed downlight fixture is specifically adapted to replace the incandescent or fluorescent downlight fixture and use the space within the ceiling opening left by the removed incandescent or fluorescent downlight fixture. The retrofit application is applicable to the existing opening of the ceiling and without any modification to the ceiling or the previous installation brackets or hanger bars, for example. Conversely, in a new construction application, where the ceiling is not yet present, the improved LED recessed downlight fixture can be mounted to at least one ceiling joist and will allow universal adjustment to the light source similar in some ways to the retrofit application and its universal adjustment.

By allowing adjustment of the light source relative to the fixture and, more specifically, the fixture location within a ceiling and regardless of that location, the LED recessed downlight fixture can cast illumination from the LEDs in any adjustment pattern through the ceiling opening. In this fashion, the improved LED recessed lighting fixture hereof can not only retrofit to previously placed incandescent or fluorescent recessed lighting fixtures, but can compensate for changes in LED illumination from the incandescent or fluorescent illumination patterns as well as sub-optimal placement of the previous fixtures within the ceiling—either prior to the ceiling in a new construction application, or after the ceiling in a retrofit application.

According to a first embodiment, a recessed downlight fixture is provided in a retrofit application. The recessed downlight fixture, most preferably an LED recessed downlight fixture, comprises a foldable ring that can be inserted through an existing opening of the ceiling when placed in a folded configuration. Once the foldable ring is placed in a folded position through the ceiling opening, the foldable ring is expanded to an unfolded position to expose at least one ring protrusion extending radially inward from the foldable ring over a portion of the circular opening. A flange can then be secured by a coupling member to the ring protrusion, where the flange is then secured below and partially into the circular opening of the ceiling when the foldable ring is unfolded. Accordingly, the unfolded, foldable ring is placed above the ceiling and partially over the ceiling opening. The flange is secured below the ceiling and partially below the ceiling opening. The foldable ring and flange secured to the ring can accommodate a luminaire housing that is inserted through the ceiling opening and specifically through the opening formed by the ring and the flange.

The luminaire housing comprises a circular base on which the housing can move. The circular base comprises at least one radially inward extending recess dimensioned in the outer circumference of the circular base to allow the ring protrusion to pass through the recess when the luminaire housing coupled to the circular base is passed through the opening from below the ceiling opening as well as the opening formed by the ring and attached flange. A pin is coupled to the circular base and is biased in a substantially circumferential direction against an upper surface of the ring protrusion to secure the circular base above the opening after the luminaire housing and circular base is extended to its further extent through the ceiling opening.

According to yet a further description of the first embodiment, the recessed downlight fixture in a retrofit application also comprises a first lever rotatably secured to the circular base and accessible solely within the opening and from below the opening within the ceiling. The first lever can be actuated by a user, when the user reaches into the ceiling opening from below the opening. When the first lever is rotated a first direction, the luminaire housing can rotate upon the circular base. When the first lever is rotated in a second direction opposite the first direction, the luminaire housing is prevented from rotating on the circular base.

According to yet a further description of the first embodiment, the recessed downlight fixture in a retrofit application includes at least one tilt arm having at least one tilt arm with first and second ends. A second lever is rotatably secured to a circular luminaire housing base and is accessible solely within the opening and from below the opening. When the second lever is moved in a first direction, the tilt arm allows the luminaire housing to rotate about the pin in a varying tilt position. The tilt position can vary to allow the light source to illuminate and at an angle offset from the perpendicular position relative to the ceiling. For example, the second lever, when actuated, can release the tilt arm and the light source coupled to the upper portion of the luminaire housing to be directed at an angle less than 90 degrees from the ceiling plane.

According to yet another feature of the first embodiment, the recessed downlight fixture in a retrofit application also comprises a post having a first end and a second end, where the first end is coupled to the luminaire housing and the second end extends into an aperture within a heat sink that accommodates a light source thermally bonded to the heat sink. Between the first end and the second end of the post is a groove into which an o-ring is placed. The o-ring frictionally engages between the post groove and the aperture within the heat sink to allow the heat sink and coupled light source to extend along a vertical line perpendicular to the ceiling when the heat sink and coupled light source is not tilted via the second lever. When tilted, the post allows the heat sink and coupled light source to recess further above the ceiling or less above the ceiling at an angle relative to the ceiling.

The combination of first and second levers as well as the slide able posts provides three degrees of adjustment of the upper portion of the luminaire housing relative to the opening within the ceiling. The upper portion preferably comprises a heat sink as well as a thermally bonded array of LEDs. By rotating via the first lever, tilting via the second lever, or recessing more or less via the posts, three degrees of adjustment can be performed by using the improved recessed downlight fixture within a retrofit application so as to accommodate a constrained space within the ceiling, the pre-existing ceiling opening and any angular configuration of the ceiling. By tilting the luminaire housing relative to the ceiling opening via the second lever, the downlight fixture can be used to maintain a straight downward illumination pattern even though the ceiling is pitched.

According to a second embodiment utilizing a recessed downlight fixture in a new construction application, a foldable ring need not be employed since the luminaire housing need not be inserted through an existing ceiling opening. Instead, the ceiling would not exist during installation, yet the ceiling would thereafter be installed below the fixture after the fixture is installed. The recessed downlight fixture according to the second embodiment can be one involving a plate having a planar surface configured to couple to at least one ceiling joist. The recessed downlight fixture according to the second embodiment also comprises a circular base coupled around an opening within the plate. A luminaire housing, and specifically a first portion of the luminaire housing, is rotatable within the circular base. A second portion of the luminaire housing is tiltable relative to the first portion of the luminaire housing. A first lever is accessible through the opening within the plate for frictionally engaging the first portion of the luminaire housing to the circular base. A second lever is accessible also through the opening within the plate for frictionally engaging the second portion of the luminaire housing to the first portion of the luminaire housing.

The recessed downlight fixture of the second embodiment also comprises a magnet coupled to a surface of a heat sink. A ferromagnetic member that can magnetically attract the magnet is coupled to the second portion of the luminaire housing, wherein the ferromagnetic member also comprises a first stop configured a first distance from the opening within the plate. A second stop is configured a second distance from the opening within the plate. The second distance being greater than the first distance. The heat sink can be moved by various means, such as for example, pressing upon the heat sink beneath the opening within the plate. Alternatively, the heat sink can be moved toward the opening within the plate. When the heat sink is moved toward the opening within the plate, the magnet is maintained against the first stop. When the heat sink is moved away from the opening within the plate, the magnet is maintained against the second stop.

Therefore, according to the second embodiment, the recessed downlight fixture is somewhat similar to the first embodiment recessed downlight fixture except that the second embodiment fixture is for new construction and the first embodiment downlight fixture is for the retrofit application. However, similar to the first embodiment retrofit downlight fixture, the new construction second embodiment downlight fixture includes a first lever and a second lever that frictionally engage to allow respective rotation of a luminaire housing relative to the opening and tilt adjustment of the luminaire housing relative to the ceiling opening. The first and second levers, like the first embodiment, frictionally engage to allow or disallow rotational and tilt adjustment. However, unlike the first embodiment of the retrofit application utilizing post and frictional engagement of posts within apertures of the heat sink, the second embodiment of a new construction application provides magnetic engagement instead of frictional engagement. The frictional engagement of posts with o-rings within apertures increases or decreases the amount of recess. The second embodiment performs the same increase or decrease in the amount of recess but using magnetic engagement.

According to yet a third embodiment, the recessed downlight fixture having a collar can be adjusted both rotationally and along a plane parallel to the ceiling. Specifically, according to the third embodiment, the collar of the fixture extends downward to form a circular flange. The flange that extends downward is one that extends perpendicular downward from a circular opening of the collar, where the flange extends within the circular opening of a ceiling to be formed about the flange after the fixture is secured to a ceiling joist. However, it is oftentimes desirable to align the circular flanges relative to one another within a ceiling. In many instances, an installer will ensure that all of the collars that are used to form the circular opening of the ceiling within a room are aligned using, for example, a laser aiming device.

To ensure the collars are all in a straight row, from beneath the plate, and specifically opposite the planar surface on which the circular base and luminaire housing are secured is a second plate. The second plate is movably secured to a planar surface of the plate and, more specifically, the collar used to form the ceiling opening, or ceiling aperture, extends through the plate as well as the second plate within the circumference of the circular base. The collar, however, is moveable with the second plate. When an installer aligns the collar so that all of the luminaire housings as well as the light sources are in line with one another, he or she moves the second plate which correspondingly moves the collar to the desired location on each plate. The installer can, for example, loosen one or more screws placed through the second plate and into at least one threaded washer that frictionally bears against the first planar surface of the plate on which the circular base and luminaire housing are mounted. In this fashion, the installer can adjust the collar, and specifically the ceiling opening around the collar so that all of the collars of each recessed downlight fixture in a new construction application can be aligned with one another in a single row, for example. Moreover, the adjustment of the collar, like all adjustments in the first and second embodiments of the retrofit and new construction applications, are performed below the downlight fixture, for example, within a room beneath the joists or the ceiling. An installer either in a retrofit or new construction application can therefore easily adjust the downlight fixture, and specifically the luminaire housing on which the LED light source is thermally bonded in three degrees of movement, and all adjustments are performed beneath the downlight fixture, with most such adjustments being performed within the opening of the ceiling so that adjustments can be periodically made even after the ceiling is installed. Accordingly, three degrees of movement, or universal adjustment, in a retrofit or new construction application is purposefully made in LED light source installs to accommodate any LED illumination pattern within a downlight fixture.

BRIEF DESCRIPTION OF THE DRAWINGS

Other objects and advantages of the invention will become apparent upon reading the following detailed description and upon reference to the accompanying drawings.

Figure 1:
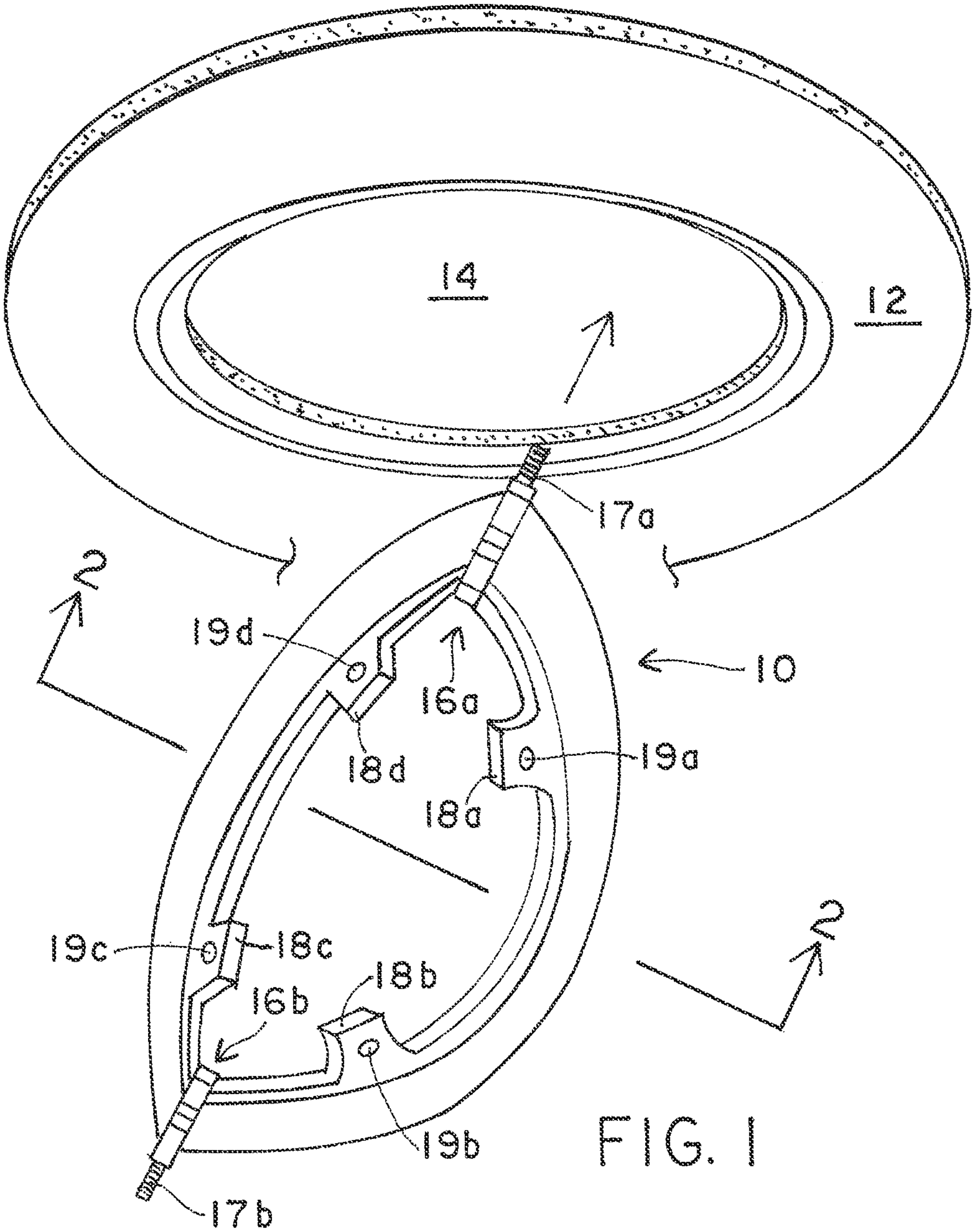
FIG. 1 is a perspective view of a foldable ring inserted through a circular opening in a ceiling.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 10:
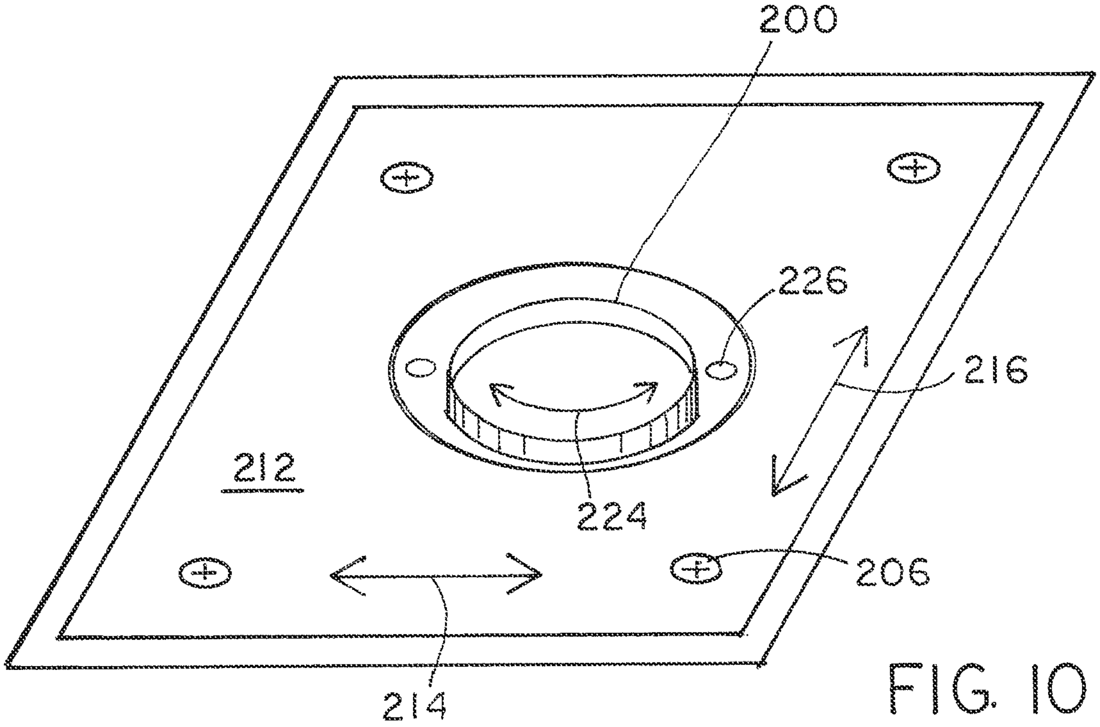
FIG. 10 is a perspective view of the new construction downlight fixture having a collar configured to be placed into an opening of the ceiling but is rotatable about a central axis of the collar and moveable in a plane parallel to the ceiling to accommodate a fine-tune adjustment of the opening to other openings within the ceiling.
Figure 11:
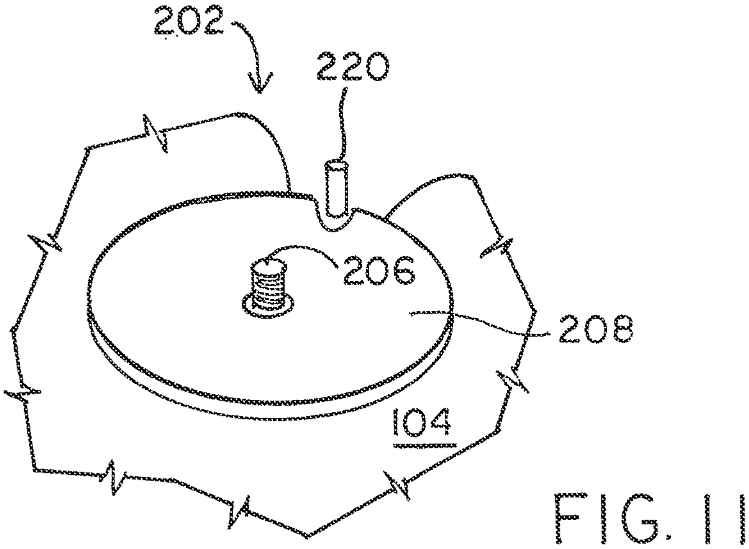
FIG. 11 is a detailed view of cutouts in the plate also shown in FIG. 7, which holds the luminaire housing and pins extending from the plate to prevent a threaded washer from moving when a second plate that holds the collar is moved in order to perform the fine tune adjustments of the collar opening to the room below.

Referring now in detail to the drawings, wherein like numerals indicate like elements throughout the several views. There is shown in FIGS. 1-5 a retrofit recessed downlight fixture according to a first embodiment. There is shown in FIGS. 6-9 a new construction recessed downlight fixture according to a second embodiment. There is shown in FIGS. 10 and 11 further details of the new construction recessed downlight fixture with moveable collar opening according to a third embodiment.

Beginning with the first embodiment, and referring to FIG. 1, a foldable ring 10 is shown insertable through an opening in a ceiling 12. The opening 14 results from the extraction of a previously placed recessed downlight fixture associated with, for example, an incandescent or fluorescent fixture in favor of a to-be installed LED recessed downlight fixture, for example. Alternatively, opening 14 could also be in a newly created opening in a ceiling where there may have not been any previously installed fixture and thus not necessarily used to replace an existing light fixture. In order to install the new LED recessed downlight fixture into opening 14, retaining ring must be inserted into the opening 14 which pre-exists or is created within the ceiling 12 without disrupting ceiling 12. Accordingly, ring 10 must be foldable upon itself.

Foldable ring 10 includes two axis 16*a* and 16*b* about which ring 10 folds onto itself. Ring 10 can either be of circular, square or rectangular outer dimension. Each axis can be formed by a pin 17*a* and 17*b*, respectively. The pins 17 and axis 16 are collinear with each other, as shown so that the ring can rotate about pins 17*a* and 17*b* to diminish the overall profile of the ring less than its diameter and, in fact, approximately equal to its radius so that ring 10, when folded, can fit through the pre-existing opening 14 within ceiling 12. Depending on the dimension of the ring, the opening 14 can be circular, square or rectangular. Included on ring 10 is at least one ring protrusion 18*a*. As shown in FIG. 1, there can be four ring protrusions 18*a-d* that extend radially inward when the foldable ring is unfolded above the opening 14, and above ceiling 12 in a retrofit application.

Figure 2:
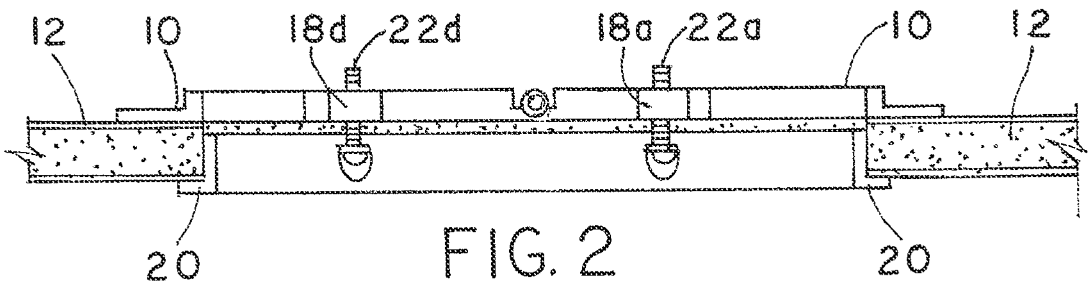
FIG. 2 is a cross sectional view of the foldable ring expanded above the circular opening upon which a circular flange is secured below and partially within the circular opening.

FIG. 2 is a cross-sectional view along plane 2-2 of FIG. 1, and illustrates ring 10 unfolded upon the upper surface of ceiling 12. Ring 10 is unfolded about the axes 16*a* and 16*b*, shown in FIG. 2, and secured to a flange 20 placed below and partially into the circular opening 14. FIG. 2 illustrates the unfolded, foldable ring 10 secured to flange 20 on opposite planar surfaces of ceiling 12, all shown in cross-section. At least one coupling member 22 is placed through an aperture that extends radially inward from the flange 20 through an aperture within, for example, protrusion 18*a*. The aperture within protrusion 18*a* is shown as reference numeral 19*a* in FIG. 1. Also shown in FIG. 1 are respective apertures 19*b*-19*d* corresponding to protrusions 18*b*-18*d*. Coupling member 22 can be a screw, wherein the ring protrusion 18*a-d* can comprise a threaded aperture 19*a*-19*d* for receiving the screw 22. For example, there can be four screws 22*a*-22*d*, and the threaded screws 22*a*-22*d* can be placed through apertures on flange 20 and into threaded apertures 19*a*-19*d* on ring 10 to secure flange 20 onto ring 10, both of which are held on opposing surfaces of ceiling 12.

FIG. 2 illustrates a cross-sectional view along the plane 2-2 of FIG. 1, and extends directly between protrusions 18*a/d* and 18*b/c* showing corresponding threaded screws 22*a* and 22*d* placed in respective apertures 19*a* and 19*d*. Similar to ring 10, flange 20 is circular and of approximately the same interior dimension as ring 10. Combination of ring 10 and secured flange 20 forms an opening within the ceiling opening 14 to accommodate the luminaire housing and circular base. The luminaire housing coupled to the circular base is inserted below the ceiling 12 and through the opening formed by the interior dimensions of ring 10 and flange 20.

Figure 3:
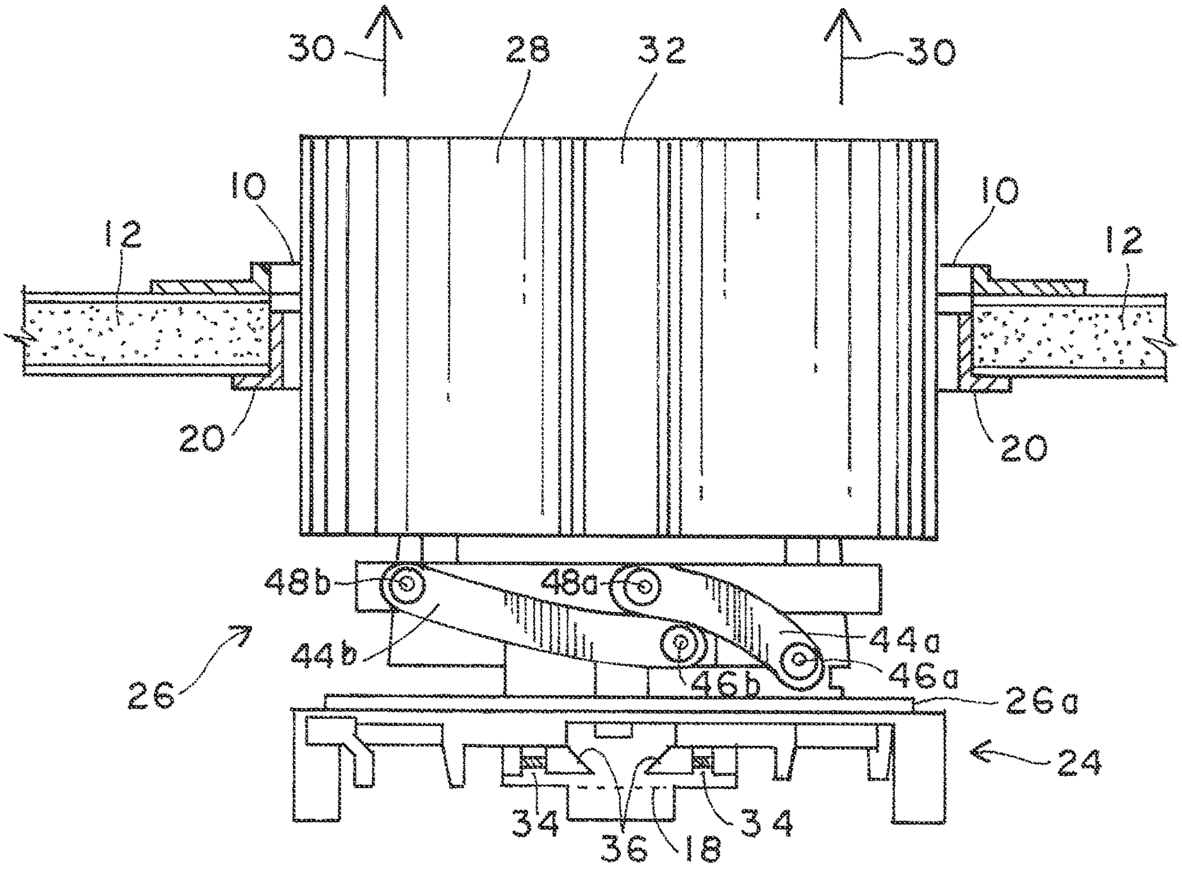
FIG. 3 is side view of a downlight fixture according to a retrofit embodiment, placed through the secured circular flange shown in cross section secured to an existing ceiling and toward a fixed recessed position above the ceiling.

Shown in FIG. 3 is a circular base 24 on which a luminaire housing 26 is moveably coupled. Luminaire housing 26 can comprise a first portion and a second portion of the luminaire housing, with a first portion 26*a* sometimes interchangeably referred to as a circular luminaire housing base. It is understood, however, that luminaire housing 26 nonetheless moves relative to circular base, as does the first portion, or circular luminaire housing base 26*a*. However, first portion 26*a* rotates relative to circular base 24, and second portion 26 can tilt relative to first portion 26*a*, as well as circular base 24. Moreover, second portion 26 can include a heat sink 28 that comprises a light source that moves perpendicular to the plane formed by first portion 26*a* as well as the plane formed by circular base 24, provided the second portion 26 is not tilted. FIG. 3 illustrates the first and second portions of the luminaire housing 26*a* and 26, respectively, as well as circular base 24, inserted through the opening formed within ceiling 12 between the circular plate 10 and circular flange 20, as shown by arrows 30.

Within a circular heat sink 28 is at least one groove 32 that is dimensioned to allow the heat sink as well as all other portions of luminaire housing 26 and 26*a* and the circular base to be inserted through the opening formed by plate 10 and flange 20. When the luminaire housing 26 and its circular luminaire housing base 26*a* is inserted entirely through the opening, circular base comprises at least one pin that is biased substantially circumferentially around circular base 24 and against an upper surface of the ring protrusion shown in dashed line 18. Accordingly, the recess 32 accommodates the ring protrusion that extends into the recess 32 as the downlight fixture comprising the luminaire housing and circular base 34 are inserted through the opening. There can be more than one pin 34, and the biasing member can comprise a spring around pin 34. One end of the pin 34 has a sloped surface. That distal end and, specifically the slope 36 frictionally engages the ring protrusion as luminaire housing 26 is passed through the opening, causing the sloped end 36 to compress the spring on pin 34 and, once the protrusion passes through the angular distal end 36, the spring on pin 34 will push the distal end outward so that the lower surface of the sloped distal end 36 will reside on the upper surface of the protrusion 18. Once the sloped distal end extends outward in a circumferential direction about circular base 26, the luminaire housing 26, as well as the circular luminaire housing base 26*a*, and circular base 24 are securely held by the ring 10 and flange 20 to ceiling 12. Luminaire housing 26, circular luminaire housing base 26*a* and circular base 24 are held in a recessed position above ceiling 12.

Figure 4:
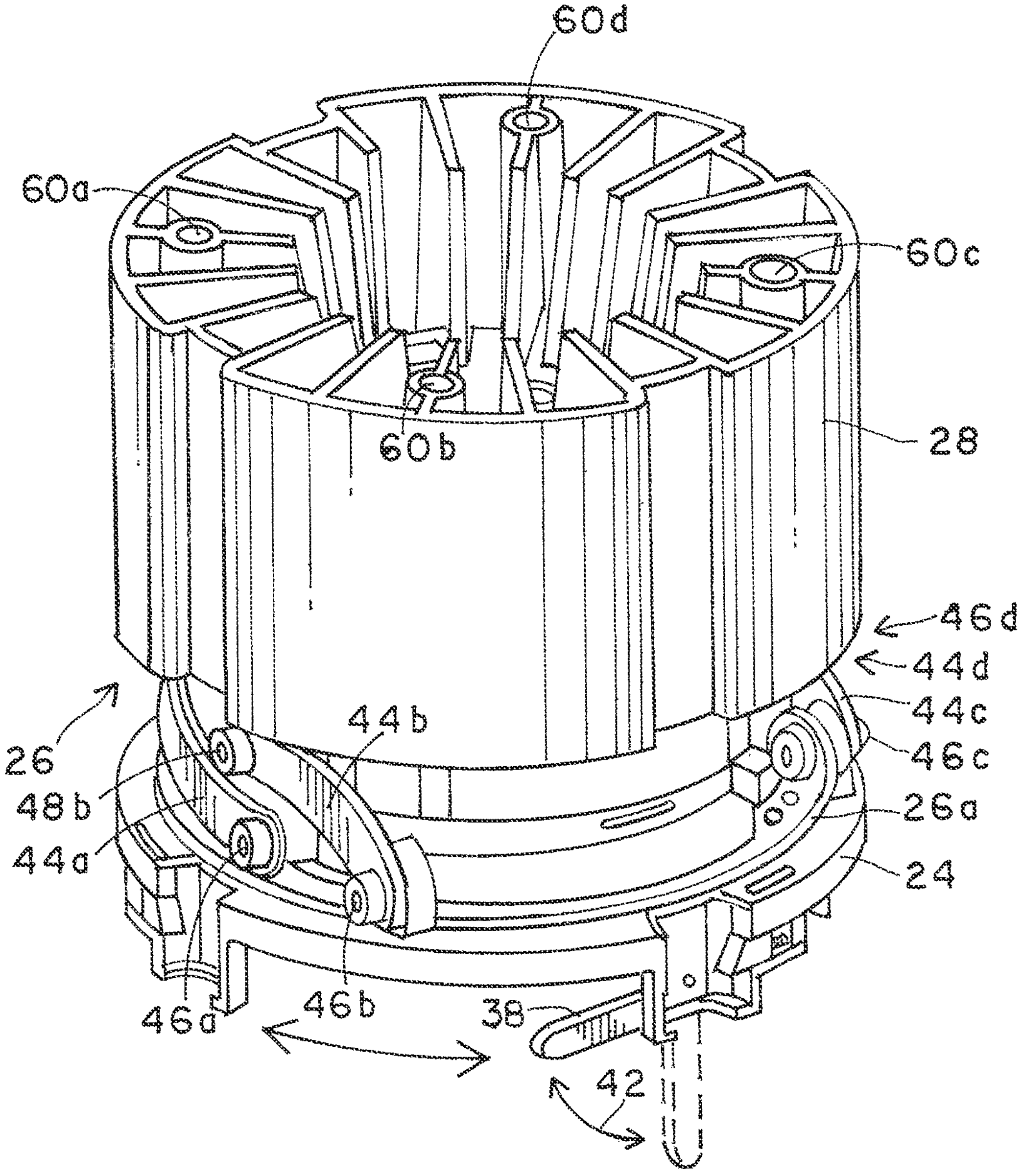
FIG. 4 is a perspective view of the retrofit downlight fixture shown having a first lever moveable from inside the circular opening to allow rotation of a luminaire housing within the recessed downlight fixture in a plane parallel to the ceiling.

Turning now to FIG. 4, an illustration is provided of the rotation of luminaire housing 26 upon a secured circular base 24. In addition, FIG. 4 illustrates a first lever 38 secured to circular base 24 and used to frictionally engage the first portion of the luminaire housing 26*a*, also known as the circular luminaire housing base.

The first portion of the luminaire housing, or circular luminaire housing base 26*a* rotates within the circular base 24. When lever 38 is moved upward from the position shown in dashed line to the position that is labeled, a block member shown in FIG. 5 within circular base 24 is configured to move upward between one end of first lever 28 and the circular luminaire housing base 26*a*. Block member 40 is adapted to move between the first lever 38 and the circular luminaire housing base 26*a* such that when it is compressed upward via the rotational movement of first lever 38, it prevents rotation of the luminaire housing, and specifically the circular luminaire housing base 26*a* within a plane parallel to the ceiling. When first lever 38 is moved downward, however, block member 40 also moves downward and no longer frictionally bears again the circular luminaire housing base 26*a* so as to allow rotation of the luminaire housing in a plane parallel to the ceiling. The movement 42 shown in FIGS. 4 and 5 of first lever 38 to the position shown in dashed line is illustrative of member 40 moving away from and frictionally disengaging from the first portion of a luminaire housing, or circular luminaire housing base 26*a*. Importantly, first lever 38 is accessed beneath the ceiling within the opening 14, shown in FIG. 1 by a user standing within a room reaching up into the recessed downlight fixture to actuate the first lever 38 within the pre-existing opening of the ceiling.

Figure 5:
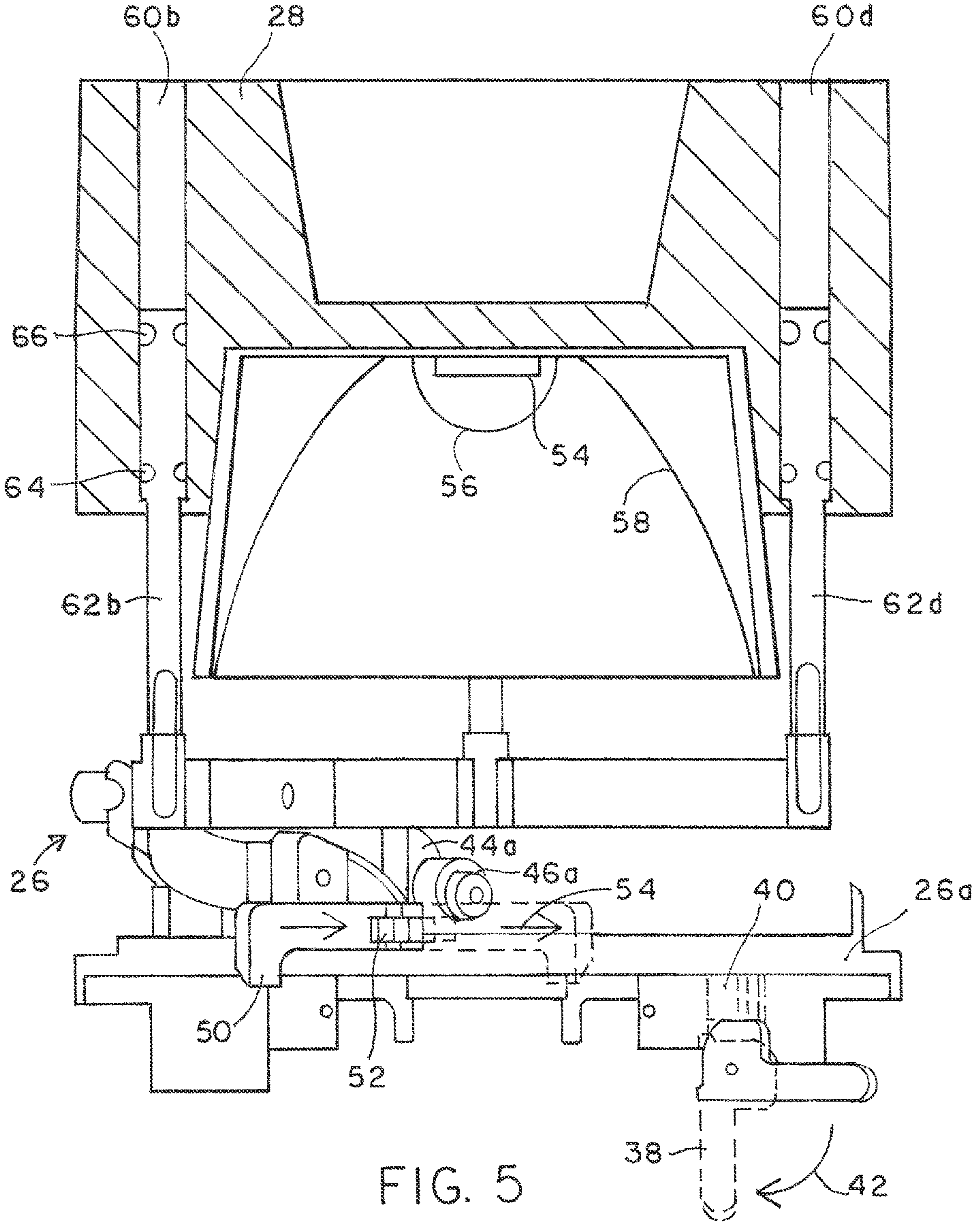
FIG. 5 is a partial cross sectional view of the luminaire housing within the retrofit downlight fixture moveable on pins extending substantially perpendicular to the ceiling when the luminaire housing is not tilted, and further having a second lever also moveable from inside the circular opening to allow tilt of the luminaire housing about at least two pins extending through the downlight fixture co-linear with one another, separated by the circular opening, and extending parallel to the ceiling.

FIGS. 4 and 5 also show the second portion of the luminaire housing, oftentimes referred to as simply the luminaire housing 26 having at least one tilt arm 44*a*-44*d*. Each tilt arm 44 comprises opposed first and second ends. The first end is coupled to the circular luminaire housing base 26*a* via a pin 46*a*-46*d*. The second end of each tilt arm 44 is coupled above the luminaire housing base to the second portion of the luminaire housing, or luminaire housing 26. The second end is coupled also by pins 48*a*-48*d*, with only the pin 48*b* showing in FIG. 4.

A second lever 50 is shown in FIG. 5 coupled by a pin and cam member 52 to the circular luminaire housing base 26*a*. When the second lever 50 is moved to the position shown in dashed line in FIG. 5 in the direction of arrow 54, the cam member 52 extends against the tilt arm pin 46*a*. Once the cam member 52 extends against the tilt arm pin 46*a*, movement of the tilt arm pin 46*a* is prevented and thereby preventing any movement to the tilt arm 44*a* coupled to the tilt arm pin 46*a*. Accordingly, as shown in FIG. 5, movement of the second level 50 causes movement of a cam member 52. Depending on the position of second lever 50, the tilt arms can either rotate around their corresponding pins, or are prevented from rotating about their pins. If the tilt arms are allowed to move, then the second portion of the luminaire housing 26 can tilt on the first portion 26*a*, as well as on circular base 24. The tilt mechanism allows the second portion containing a heat sink 28 and a thermally bonded set of one or more LEDs 54 to illuminate at an angle offset from perpendicular at an angle less than 90 degrees from the plane formed by the circular luminaire housing base 26*a*, circular base 24, and ceiling 12. The LED light source can comprise an array of LEDs of different colors, such as red, green, blue and white. The array of LEDs 54 can be encapsulated within an encapsulant material 56 and placed within a parabolic reflector 58 to form a PAR lamp, or PAR luminaire.

Shown in FIGS. 4 and 5 is second portion 26 comprising a heat sink 28 having at least one aperture 60*a*-60*d*, with FIG. 5 showing two apertures 60*b* and 60*d*, in cross-section. Apertures 60 accommodate a post 62 and, if there are four apertures, four posts 62*a*-62*d*. Each post has a first end and a post second end. The first end is coupled to the luminaire housing 26, and specifically, the second portion of the luminaire housing 26. Between the first end and the second end is at least one groove that extends around the circumference of each pin 62. Within each groove is an o-ring and, if there are two grooves, two o-rings 64 and 66 for each post 62. The aperture 60 within the heat sink allows the post 62 to slide up and down within the aperture, with the corresponding pair of o-rings 64 and 66 frictionally engaged within the aperture 60, between the aperture inner walls and the recesses within post 62. The o-rings are preferably made of a rubberized material with elasticity so as to apply a biasing force between the post and inner walls of each aperture, and to maintain that biasing force at whatever position the posts are within the corresponding aperture.

The luminaire housing 26, and specifically the heat sink portion of the luminaire housing 26 containing the thermally bonded light source 54 moves up and down upon the posts 62 so as to increase the amount of recess above the ceiling, or decrease the amount of recess above the ceiling, depending upon the user desired position.

The combination of FIGS. 1-5 illustrates the first embodiment for a recessed downlight fixture, and specifically a fixture to be used in a retrofit application. The method for installing the fixture that includes ring 10, flange 20, circular base 24, first and second portions of luminaire housing 26*a* and 26, respectively, first and second levers 38 and 50, the associated block and cam members of those levers, and the posts 62 and corresponding apertures 60 within heat sink 28 as well as light source 54, etc., all comprise the recessed downlight fixture used in a retrofit application. The methodology for installing the retrofit recessed downlight fixture therefore includes folding ring 10 onto itself, then inserting the folded ring 10 through an opening 14 within a ceiling, then unfolding the ring 10 above the ceiling 12. Thereafter, a circular flange 20 is attached below and partially within the opening 14 to the unfolded ring 10. A circular base 24 on which a luminaire housing (first and second portions) is inserted into the opening formed by the unfolded ring and attached circular flange. The circular base in which the luminaire housing is moveable allows the luminaire housing to be moved in three degrees of motion using the first lever 38 to rotate the luminaire housing, the second lever 50 to tilt the luminaire housing, and the posts 62 to recess in a direction perpendicular to the ceiling. Importantly, all three degrees of motion can be actuated and frictionally stopped and held in a stationary position after movement through the opening from beneath the opening of the ceiling. Thus, once the recess downlight fixture is placed into the pre-existing opening 14 within ceiling 12 after, for example, removing a previously placed recessed downlight fixture, the present recessed downlight fixture that has been inserted can thereafter be adjusted in at least one of the three degrees of motion from beneath the opening and through the opening. No changes or modification whatsoever to the ceiling opening 14 are needed.

FIGS. 6-9 illustrate a second embodiment in which a recessed downlight fixture is applied to a new construction application in which a ceiling is not yet present. Instead, all that is present during install is at least one ceiling joist 100. Ceiling joist 100 is exposed from below, and either exists as a subfloor of the room above, or in the attic, along with ventilation ducts, fire sprinkler systems, conduits of various kinds for data cables, etc.

Figure 6:
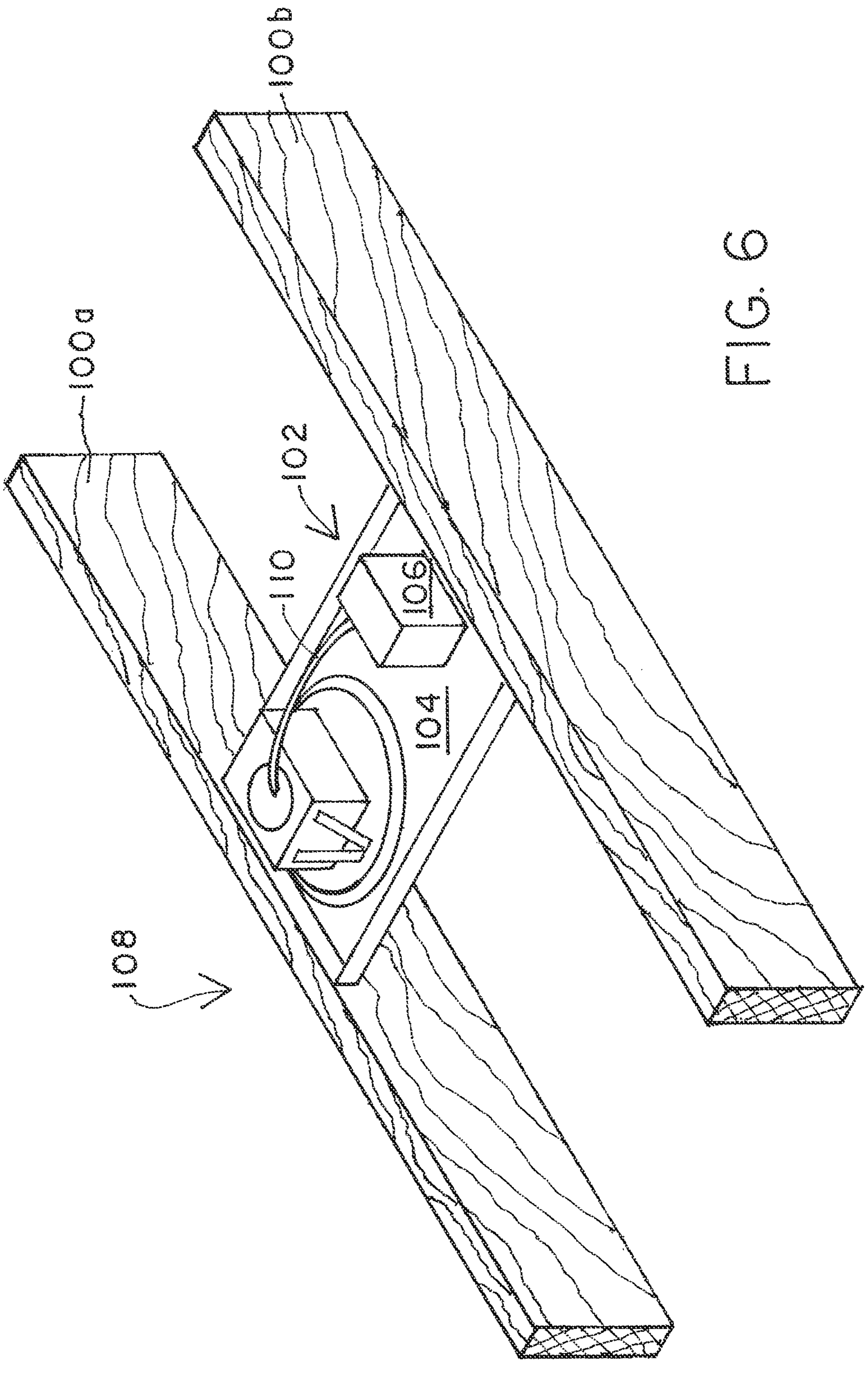
FIG. 6 is a perspective view of a downlight fixture according to a new construction embodiment, secured between a pair of ceiling joist prior to a ceiling being applied to the joists.

A recessed downlight fixture 102 for use in a new construction application can be coupled to a single ceiling joist 100*a*, or coupled to a spaced apart pair of ceiling joists 100*a* and 100*b*, as shown in FIG. 6. Fixture 102 includes a plate 104, possibly having a junction box 106 and other elements of downlight fixture 102, labeled 108. Those other elements will be described in more detail with reference to FIGS. 7-9. Similar to the first embodiment for the retrofit application, the second embodiment for a new construction application includes electrical components, such as wiring and AC mains interface. That interface is any electrical interface that can receive the AC mains power supply and convert that power supply to, for example, current drivers of an LED driver circuit. A portion of the AC mains interface can be contained within junction box 106, with an appropriate cabling 110 between the junction box and the LED module. It is understood that similar interfaces and cabling are associated with the first embodiment, and need not be shown.

Figure 7:
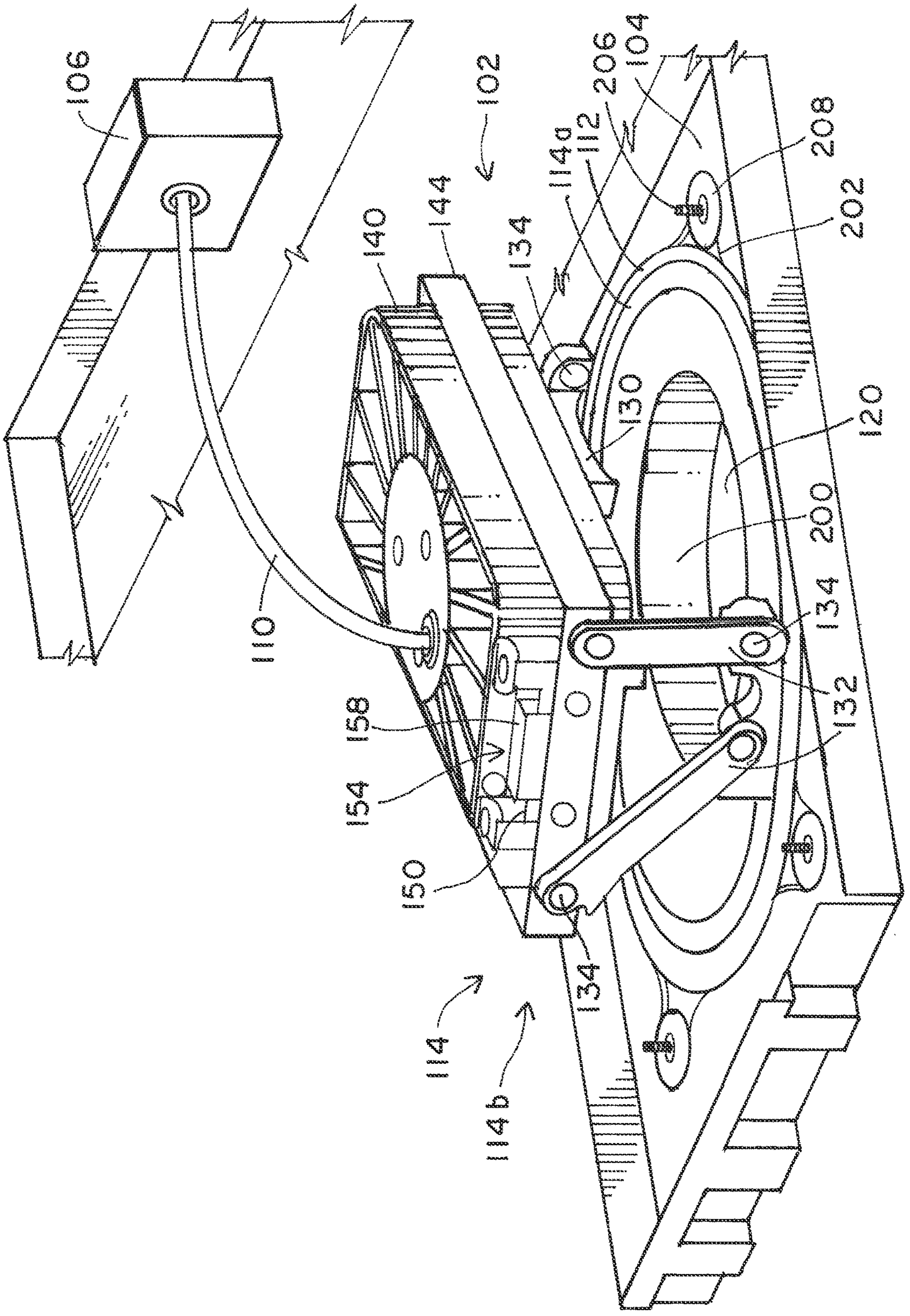
FIG. 7 is a perspective view of the new construction downlight fixture showing a second lever similar to the second lever shown in FIG. 5 for the retrofit downlight fixture, wherein the second lever is moveable from inside the circular opening to allow tilt of the luminaire housing.

Turning now to FIG. 7, plate 104 is shown in more detail containing the various elements of the recessed downlight fixture, separate and apart from the junction box 106, and cabling 110. Placed on plate 104 are the other elements which, in combination with plate 104, comprise the recessed downlight fixture 102, also shown in FIG. 6. Recessed downlight fixture 102 for new construction application therefore comprises plate 104 having opposed planar surfaces, with a first planar surface shown to receive a circular base. Circular base is secured to the first planar surface, which is the upper surface shown in FIG. 7 of plate 104.

A luminaire housing 114, and specifically a first portion of the luminaire housing 114*a* on which a second portion 114*b* extends above, rotates within the circular base 112. While first portion of 114*a* can rotate within circular base 112, circular base 112 is rigidly fixed to plate 104. The second portion 114*b* is tiltable relative to the first portion 114*a*. As such, the second portion 114*b* of luminaire housing 114 can tilt relative to the first portion 114*a* of luminaire housing 114, and first portion 114*a* can rotate relative to the plate. The overall luminaire housing 114 can therefore rotate and tilt relative to the plate 104.

Figure 9:
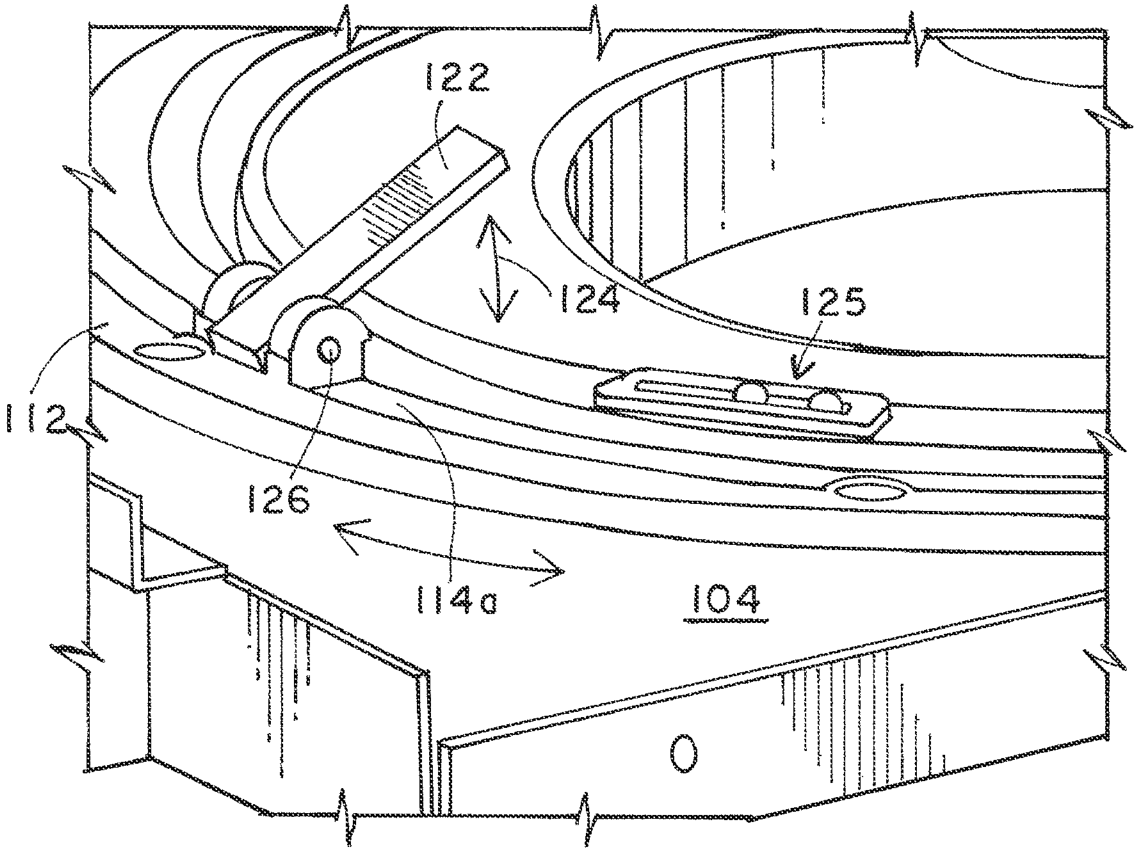
FIG. 9 is a partial perspective view of the new construction downlight fixture having a first lever moveable from inside the circular opening to allow rotation of the luminaire housing within the recessed downlight fixture in a plane parallel to the ceiling.

A first lever shown in FIG. 9 is accessible through the opening 120 within the plate 104 and, when actuated, frictionally engages the first portion 114*a* of the luminaire housing 114 to the circular base to prevent further rotation. Absent movement of the first lever 122 along the arrow 124 in FIG. 9, the first portion 114*a* is free to rotate beyond 360 degrees, and up to approximately 365 degrees, within circular base 112, and within the plane formed by circular base 112 substantially coplanar with plate 104. A rotational extender 125 allows for an additional 5 degrees of rotation to when the extender 125 having a groove that allows the two protrusions to slide within that groove an additional 5 degrees of rotation.

FIG. 9 further illustrates in detail the first lever 122 and its upward or downward movement 124. When moved upward, for example, one end of lever 122 bears against the circular base 112 about pivot pins 126. When moved downward in the illustration of FIG. 9, first lever 122 will rotate downward thereby causing the end next to the pivot pins 126 to frictionally disengage from the circular base. Thus, while the pivot pin and lever 122 are fixed to the first portion 114*a*, movement of the first lever 122 will cause frictional engagement or disengagement from the circular base 112 that is coupled to the stationary, non-moveable plate 104. Thus, FIG. 9 illustrates the rotational movement, and fixing of that rotational movement at the desired rotational angle using a first lever 122. The illustration of FIG. 9 provides a detail of that mechanism absent the overlying second portion that could, if shown, obstruct the rotational movement mechanism, and the fixing thereof by first lever 122.

Referring to FIG. 7, a second lever 130 that is accessible through opening 120 within plate 104 can be moved to frictionally engage the second portion 114*b* of luminaire housing 114 to the first portion 114*a*. When second lever 130 is placed in a first position, tilt arms 132 are free to rotate about pins configured at one end of each tilt arm 132. When the second lever 130 is placed in a second position, one end of second lever 130 bears against, either directly or indirectly, a pin 134 at one end of a tilt arm 132 to prevent movement of all of the tilt arms 132 relative to a pin rotatably coupled to first portion 114*a*. Thus, the second lever 130 is moveable to secure at least one tilt arm attached to the second portion 114*b* from tilting relative to the first portion 114*a*. When second lever 130 does not bear against a pin 134 to therefore allow tilt, the second portion on which a heat sink 140 is coupled can tilt the light source from an angle that is as much as 45 degrees from a perpendicular angle. The perpendicular angle being an angle perpendicular to the planar surface of plate 104.

Figure 8:
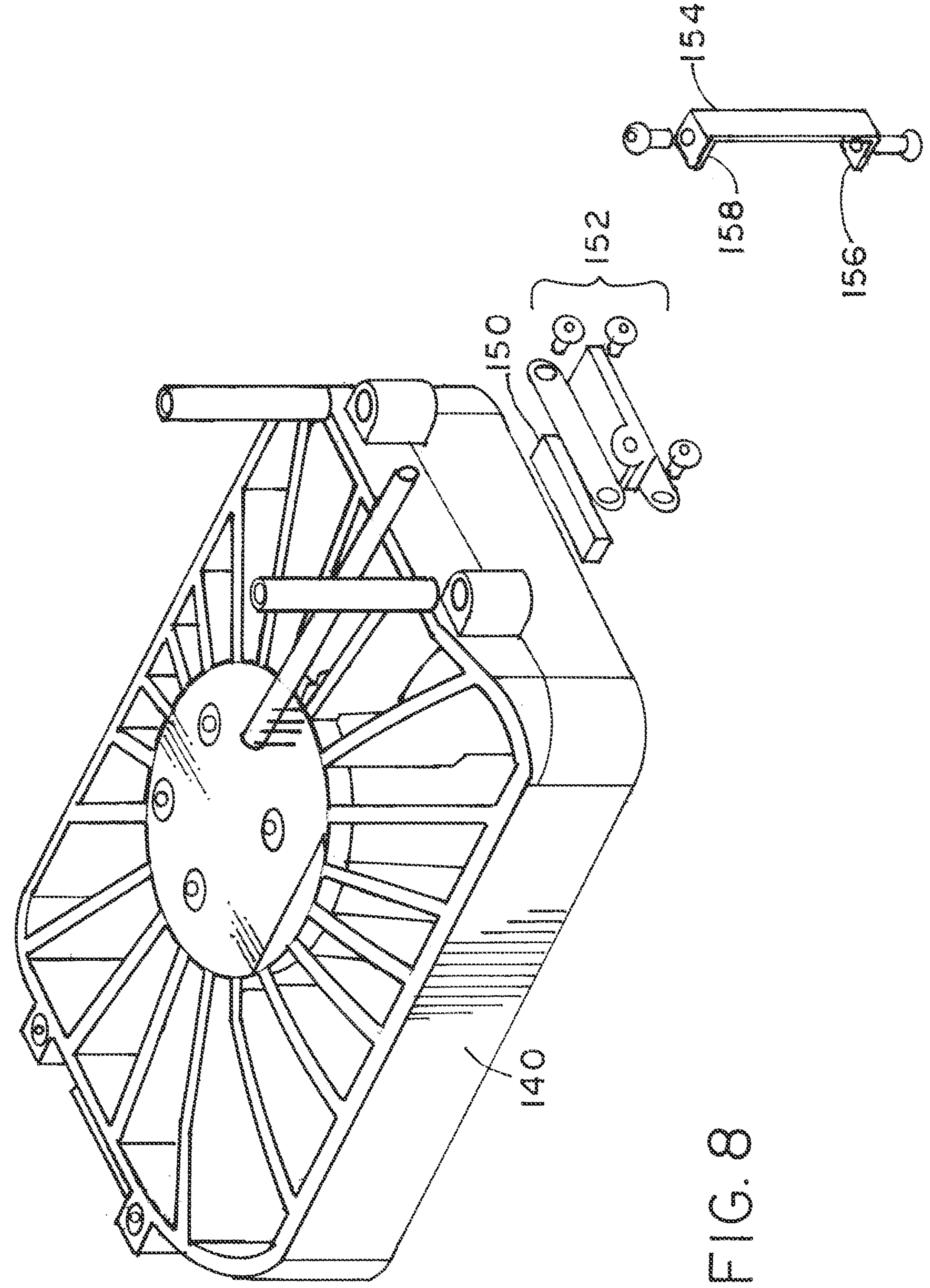
FIG. 8 is an exploded view of magnets coupled to opposite ends of a luminaire housing secured within the new construction downlight fixture to allow magnetic securement between upper and lower stops along pins that extend substantially perpendicular to the ceiling when the luminaire housing is not tilted.

The second portion 114*b* of the luminaire housing 114 includes a bracket 144 that surrounds and secures heat sink 140. Moreover, bracket 144 is coupled to the upper ends of tilt arms 132 via pins 134, as shown. When the pins 134 are secured, and the tilt arms 132 cannot move, bracket 144 as well as heat sink 140 and the thermally bonded LED light source remains fixed in a tilted position relative to plate 104. If second lever 130 does not bear against a pin 134, then bracket 144, heat sink 140 and light source bonded thereto are free to move in any tilt position offset from a perpendicular within a range of almost 45 degrees from perpendicular. FIG. 8 illustrates, in exploded view, a magnet 150 secured to at least one sidewall surface of heat sink 140. Magnet 150 can be secured by brackets, screws, etc., as shown by items 152. A ferromagnetic member 154 can be coupled to the second portion 114*b* of the luminaire housing 114 and, specifically, the bracket 144 shown in FIG. 7.

Ferromagnetic member 154 can be made of any material that can magnetically attract magnet 150 to either a first stop 156 or a second stop 158. First stop 156 is configured a first distance from the opening 120 in plate 104, whereas the second stop 158 is configured a second distance from the opening 120. The second distance is greater than the first distance. FIG. 7 illustrates a partial view of the ferromagnetic member 154, coupled to bracket 144 of the second portion 114*b*, whereas magnet 150 is coupled to a sidewall surface of heat sink 140.

When a user pushes from within opening 120 the heat sink 140 away from the opening, magnet 150 comes to bear against second stop 158. Because magnet 150 is magnetically attracted to the ferromagnetic material of ferromagnetic member 154, the magnet maintains the heat sink 140, as well as the light source bonded thereto, at the second distance further away from the opening than a first distance in which the heat sink would appear if magnet 150 were placed against the first stop.

While a user can move the light source away from or towards the opening 120, magnetic 150 will maintain that light source in either a first distance or a second distance from the opening 120. Accordingly, the amount of recess of light source can be moved and magnetically retained at the moved-to position. Contrary to the first and second degrees of movement and the frictional retention using the first and second levers, the third degree of movement (or amount of recess) is magnetically maintained.

FIGS. 6-9 illustrate the recessed downlight fixture according to the second embodiment, whereby the fixture can be moved in three degrees of movement, with the amount of recess being magnetically maintained rather than frictionally maintained in the third degree of movement. Moreover, the second embodiment shown in FIGS. 6-9 provide the universal, or three degrees of movement, from beneath the plate 104 through an opening formed in the plate 104. Still further, the second embodiment shown in FIGS. 6-9 are applicable to a new construction application in which the recessed downlight fixture is installed prior to an installation of the ceiling, and which allows universal, three degrees of adjustment to accommodate movement of the light source either rotationally, tiltably, and/or an amount of recess, to accommodate the subsequently placed ceiling, the angle of that ceiling, the type of ceiling, the space above the ceiling, the light source and the various types of illumination achieved by any type of light source.

FIGS. 7, 10 and 11 illustrate a third embodiment in which a collar opening can be adjusted in a planar x-y direction abutting against plate 104. Moreover, the collar can be rotated within the plane of plate 104. The purpose of the third embodiment is to allow an installer of the recessed downlight fixture to move the collar so that, for example, all of the collars within any given room can be placed at any desired location preferably in a straight row among a group of collars, and with less than an inch of variation.

FIG. 7 illustrates opening 120 formed by a collar 200. Collar 200, similar to all of the other components of a recessed downlight fixture preferably comprises a non-reflective material such as, for example, anodized aluminum that is of a substantially darkened color, such as black. Collar 200 includes a first portion that is co-planar with plate 104, and a second portion that extends perpendicular to the first portion, and downward from the first portion and the plane formed by plate 104. The second portion of collar 200 is circular, and extends downward at a perpendicular angle approximately one inch, or any distance comparable to the thickness of a ceiling. The ceiling would be installed around the downward extending portion of collar 200. For example, if the ceiling is made of drywall material, or gypsum board, the distance at which the second portion extends downward can be approximately one inch. It is recognized that the downward extending portion can be greater than an inch or less than an inch depending upon the thickness of the ceiling, however.

As shown in FIG. 7, the second planar surface of the plate 104 includes cutouts 202 in plate 104. Cutouts 202 extend to an opening within plate 104, also shown in FIG. 11. Extending from the lower planar surface of a second plate that slidably moves within a plane below plate 104 is a screw, or any other form of coupling member 206. On the threads of screw 206 is a threaded nut on a washer, both of unibody construction. The nut and washer are shown as reference numeral 208. Washer 208 extends beyond the cutout 202.

As shown in FIG. 10, the opposite planar surface from that of the threaded washer 208 is shown having a second plate 212. The second plate 212 includes at least one aperture through which screw 206 extends. The aperture is of a diameter approximately equal to the diameter of screw 206 so that when the head of screw 206 is loosened, screw 206 moves to loosen the frictional abutment between washer 208 and plate 104. Once screw 206 is loosened to a sufficient degree, then second plate 212 can move within a plane shown by arrows 214 and 216, substantially coplanar and abutting plate 104. The degree of movement of second plate 212 depends upon the amount of cutout 202 beneath threaded washer 208. Screw 206 can move to the edges of cutout 202 when second plate 212 is moved. Pin 220 extends from the second plate 212 to prevent rotational movement of threaded washer 208, when the head of screw 206 is loosened from beneath plate 104. Accordingly, at least one screw 206, and preferably four screws can be loosened and, once loosened, second plate 212 can move in the x and y directions as shown by arrows 214 and 216 on the lower surface of plate 104. Once the collar 200 that is coupled to the second plate 212 is moved to the appropriate position between, for example, the ceiling joists and to where the opening of the ceiling will be configured, screws 206 are tightened, and the corresponding threaded washer 208 will compress down upon plate 104 to prevent any further movement of the collar within the x-y plane. In this fashion, the collar can be placed wherever needed within the confines of the cutout 202 so that when an installer installs the recessed downlight fixture, he or she can then align one or more collars of associated fixtures precisely within a room using, for example, a laser aiming tool, or otherwise. As shown in FIG. 10, collar 200 can also be rotated along the arrow 224. Once rotated to the appropriate position, screws can be inserted into the first portion of the collar 200 and against the second plate 212, as shown by reference numerals 226.

The recessed downlight fixture according to the third embodiment therefore includes a luminaire housing that is rotatable within the circular base and tiltable relative to the circular base, and also includes a second plate moveably secured on the second planar surface of plate 104 and coupled to a collar 200 dimensioned to form an aperture that extends through the plate and the second plate as well as the circular base 112. The collar 200 is moveable within a plane, as well as rotatably moveable between the second plate 212 and the luminaire housing by at least one screw 226 configured to be placed into a threaded opening in the collar and frictionally engage against the second plate. At least one screw 206 that is placed through the second plate is placed at least into a threaded washer 208 that when the screw is tightened, the threaded washer 208 frictionally bears again the first planar surface of plate 104. The collar is moved from below the plate while standing in a room, for example. The collar is moveable in two dimensions (e.g., x-y directions) as well as rotational within a plane parallel to the second planar surface.

It will be appreciated to those skilled in the art having the benefit of this disclosure that this invention is believed to provide an improved downlight fixture that can accommodate any recessed application, whether that application is in new construction prior to a ceiling being installed or in a retrofit after the ceiling is present. The downlight fixture can also accommodate any ceiling space, whether tilted or not, or any recessed or rotational amounts needed for that space. Further modifications and alternative embodiments of various aspects of the invention will be apparent to those skilled in the art in view of this description. It is intended that the following claims be interpreted to embrace all such modifications and changes. Accordingly, the specification and drawings are to be regarded in an illustrative, rather than a restrictive, sense.

What is claimed is:

1. A recessed lighting fixture comprising:

a mounting assembly to engage a flange ring disposed in one of: a hollow wall or a hollow ceiling, wherein the mounting assembly includes:

a first mounting portion rotatably positionable with respect to the flange ring; and a second mounting portion angularly positionable with respect to first mounting portion, wherein the second mounting portion includes plurality of posts that extend perpendicularly from the second mounting portion; and a light-emitting diode (LED) light assembly including:

one or more LED emitters; and a heat sink thermally conductively coupled to the one or more LED emitters, wherein the heat sink includes:

a plurality of channels each corresponding to a respective one of the plurality of mounting posts, each of the plurality of channels to slidably receive a respective mounting post such that the LED light assembly is positionable a variable distance from the second mounting portion of the mounting assembly.

2. The recessed lighting fixture of claim 1, further comprising:

the flange ring, wherein the flange ring includes:

a foldable portion insertable through an aperture formed in at least one of; a hollow wall or a hollow ceiling; and a trim flange portion couplable to the foldable portion such that at least one of: the hollow wall or the hollow ceiling is positioned between the foldable portion and the trim flange portion.

3. The recessed lighting fixture of claim 2 further comprising a plurality of threaded fasteners couple the trim flange portion to the foldable portion.

4. The recessed lighting fixture of claim 1 further comprising:

a first lock assembly coupled to the first mounting portion, the first lock assembly to prevent rotation of the mounting assembly with respect to the flange ring.

5. The recessed lighting fixture of claim 4 wherein the first lock assembly includes:

a block member to frictionally engage the flange ring to prevent rotation of the mounting assembly with respect to the flange ring; and a lever physically coupled to the block member, the lever manually actuatable between:

a first position that disengages the block member from the flange ring to permit rotation of the mounting assembly with respect to the flange ring; and a second position that frictionally engages block member with the flange ring to prevent rotation of the mounting assembly with respect to the flange ring.

6. The recessed lighting fixture of claim 4 further comprising:

a second lock assembly coupled to the second mounting portion, the second lock assembly to prevent angular movement of the second mounting portion with respect to the first mounting portion.

7. The recessed lighting fixture of claim 6 wherein the second lock assembly includes:

one or more cam members to frictionally engage the second mounting portion to prevent angular movement of the second mounting portion with respect to the first mounting portion; and a lever physically coupled to the one or more cam members, the lever manually actuatable between:

a first position that disengages the one or more cam members from the second mounting portion to permit angular movement of the second mounting portion with respect to the first mounting portion; and a second position that frictionally engages the one or more cam members with the second mounting portion to prevent angular movement of the second mounting portion with respect to the first mounting portion.

8. The recessed lighting fixture of claim 1 wherein each of the plurality of posts includes at least one circumferential groove formed in an external surface of the respective post.

9. The recessed lighting fixture of claim 8 further comprising a flexible ring member disposed in the at least one circumferential groove of each of the plurality of posts, the at least one flexible ring member to frictionally engage an inner surface of the channel into which the respective post is inserted.

10. The recessed lighting fixture of claim 1 wherein the one or more LED emitters are physically and thermally conductively coupled to the heat sink.

11. The recessed lighting fixture of claim 1 wherein each of the plurality of posts includes a plurality of cylindrical posts.

12. The recessed lighting fixture of claim 1 wherein the one or more LED emitters comprises an array that includes a plurality of LED emitters.

13. The recessed lighting fixture of claim 12 wherein the array of LED emitters comprises an array of multi-color LED emitters.

* * * * *